United States Patent [19]

Guzowski

[11] 4,145,171

[45] Mar. 20, 1979

[54] APPARATUS FOR SEALING MULTI-PANE WINDOW UNITS

[75] Inventor: Raymond J. Guzowski, Milford, Mich.

[73] Assignee: Pyles Industries, Inc., Wixom, Mich.

[21] Appl. No.: 881,378

[22] Filed: Feb. 27, 1978

[51] Int. Cl.² .................... B29C 6/00
[52] U.S. Cl. .................... 425/110; 425/123
[58] Field of Search .................... 425/110, 123, 405 R

[56] References Cited

U.S. PATENT DOCUMENTS

| | | | |
|---|---|---|---|
| 2,718,664 | 9/1955 | Schweitger | 425/110 |
| 2,972,783 | 2/1961 | Russell et al. | 425/123 X |
| 3,257,484 | 6/1966 | Barnette | 425/123 X |
| 3,680,991 | 8/1972 | Cote et al. | 425/405 R X |
| 3,689,022 | 9/1972 | Rossetti | 425/405 R X |

*Primary Examiner*—J. Howard Flint, Jr.
*Attorney, Agent, or Firm*—Beaman & Beaman

[57] ABSTRACT

Nozzle apparatus for hermetically sealing the edges of multi-pane window units capable of performing such sealing even though the edges of the panes are misaligned. A thermoplastic sealing compound is introduced into the spacing at the edges of substantially aligned panes, and spring biased sealant containment plates disposed on opposite sides of the nozzle, each engaging a pane edge, confines the sealing material, and a blade associated with each containment plate trims the material with respect to each pane resulting in a clean joint from which excess sealing material has been trimmed, and the position of the trimming blades is automatically oriented to the pane edges.

6 Claims, 10 Drawing Figures

APPARATUS FOR SEALING MULTI-PANE WINDOW UNITS

BACKGROUND OF THE INVENTION

Multiple pane window units are widely used for thermal insulation purposes, and while early thermal multi-pane units were sealed at the pane edges by molten glass joints, the more common construction is to hermetically seal the pane edges with an adhesive sealant, usually of the thermoplastic type. In such a construction, a spacer member is interposed between the panes adjacent the edges thereof, and the spacer member is so shaped that the adhesive will fill the void intermediate the spacer and the pane edges producing a strong mechanical bond maintaining the assembly of the panes and spacer, and simultaneously sealing the panes at their edges to produce the desired insulating dead air space between the panes. Typical assembly constructions are shown in U.S. Pat. Nos. 2,138,164; 2,336,544; 3,097,061 and 3,759,771.

Thermal multi-pane assemblies are often of considerable size, measuring several feet on each edge, and while the panes are usually properly cut, difficulty is often encountered in accurately aligning the pane edges after insertion of the spacer, and maintaining such alignment. Because of this alignment problem the injection of the thermoplastic sealing material between the pane edges is not uniformly accomplished, and unsightly and irregular assembly edges result due to the difficulty in trimming the material from assemblies wherein the panes are misaligned. Further, pane misalignment often produces an uneven distribution of the sealant material about the spacer and may result in voids or breaks in the sealant which permit the entrance of moisture intermediate the panes permitting window clouding and discoloring.

BRIEF DESCRIPTION OF THE INVENTION

It is an object of the invention to provide a nozzle arrangement for introducing thermoplastic sealant material intermediate glass panes separated by a spacer even though misaligned wherein the sealant is adequately distributed between the panes and about the spacer, and excess sealant is accurately trimmed from the pane edges in accord with the position of the pane edge.

An additional object of the invention is to provide a nozzle device for assembling multi-pane window units utilizing a flowing sealant wherein the efficiency of the sealant distribution is not adversely affected by misalignment of the window pane edges, and regardless of glass pane misalignment a clean and uniform edge is produced to facilitate installation.

In the practice of the invention nozzle structure for dispensing a thermoplastic sealer, commonly called a "hot melt" sealer, such as a butyl compound is threaded into a distribution plate which includes a heater and temperature sensing elements whereby the sealer will be heated as it passes through the plate. The plate thickness corresponds to the thickness of the spacing between the glass panes of the multi-pane assembly to be assembled.

Sealant confinement plates are mounted upon each side of the nozzle plate and are spring biased in a direction to extend their outer edge beyond the nozzle orifice. The flat outer edges of the containment plates each engage the edge of a glass pane, and as the assembled panes and spacers are moved past the nozzle assembly the position of the containment plate relative to the nozzle will be determined by the glass edge engaging the containment plate edge. The containment plate is of sufficient length in the direction of the multi-pane assembly movement that the sealant will be confined between the plates and will be forcibly retained between the panes to insure a uniform sealant distribution about the spacer and adjacent the pane edges.

Trimming of the excess sealant is accomplished by a pair of scraper blades, a scraper blade being mounted upon each containment plate and positioned by the containment plate. Thus, a scraper blade edge will be accurately aligned with each glass pane edge, regardless of the relative alignment between glass pane edges, and the scraper blade will accurately remove excess sealant in alignment with the pane edge as sensed by the associated sealant containment plate. The individual positioning of the scraper blades results in a uniform trimming of the multi-pane assembly which does not create problems during installation of the assembly in its supporting frame.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Apparatus in accord with the invention includes nozzle structure generally indicated at 10 threaded upon an automatic hot melt material dispensing shut off valve generally indicated at 12 which is supplied from a thermoplastic or "hot melt" dispenser, not shown. The hot melt dispenser may be of any conventional type, such as shown in U.S. Pat. Nos. 3,637,111 and 3,976,229 includes such heated hose or conduits necessary to supply the sealant in a flowable state through the valve 12. For multi-pane assembly units a butyl thermoplastic sealer is usually employed.

Figure 1:
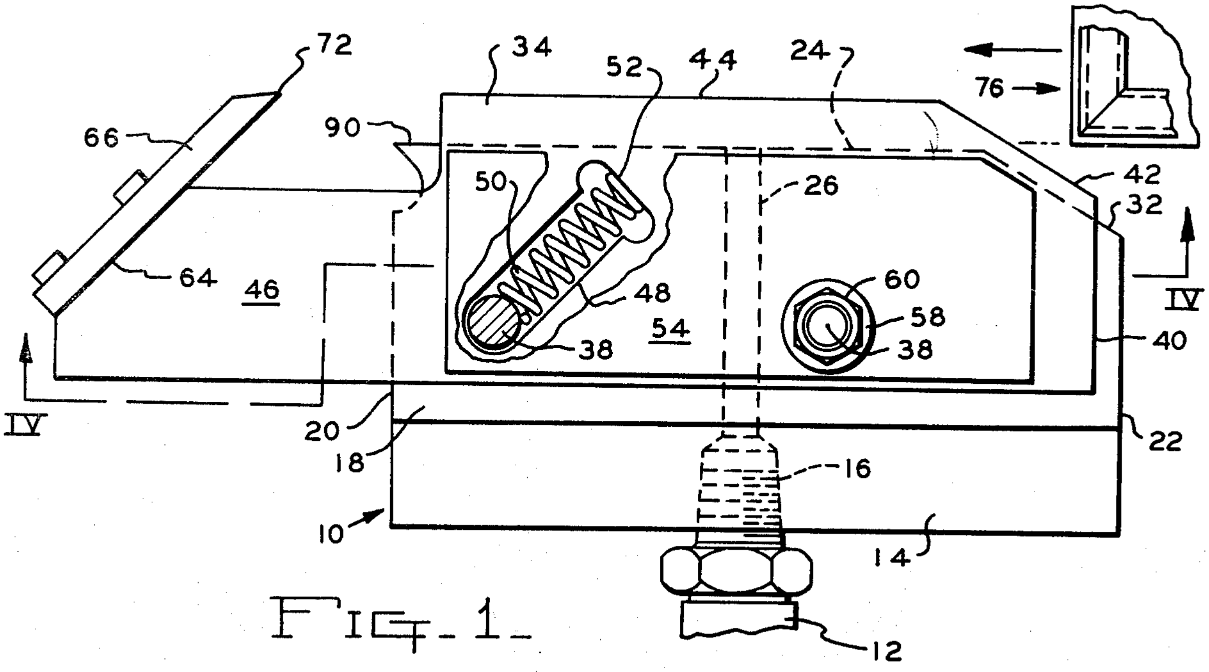
FIG. 1 is a plan view of a nozzle in accord with the invention, partially in section.
Figure 2:
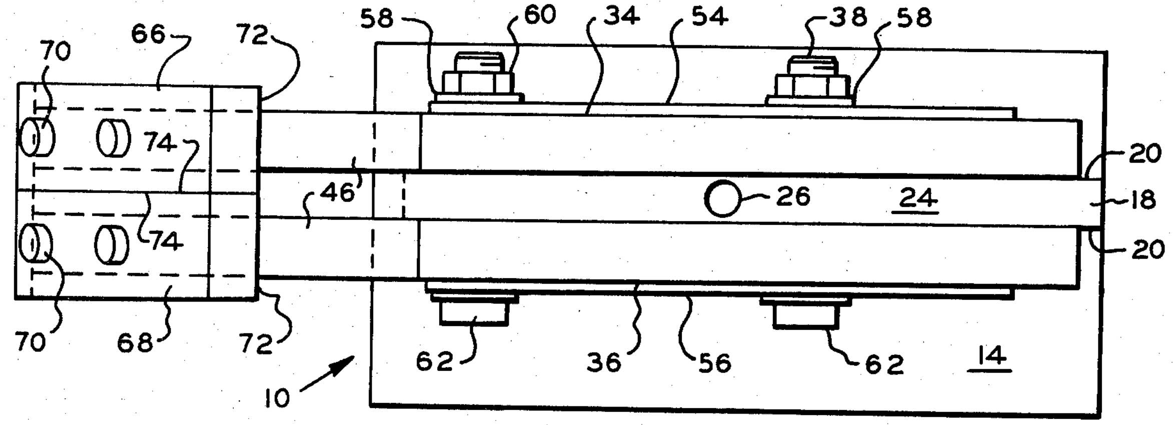
FIG. 2 is an end elevation view of the nozzle assembly of FIG. 1 as taken from the top of FIG. 1.
Figure 4:
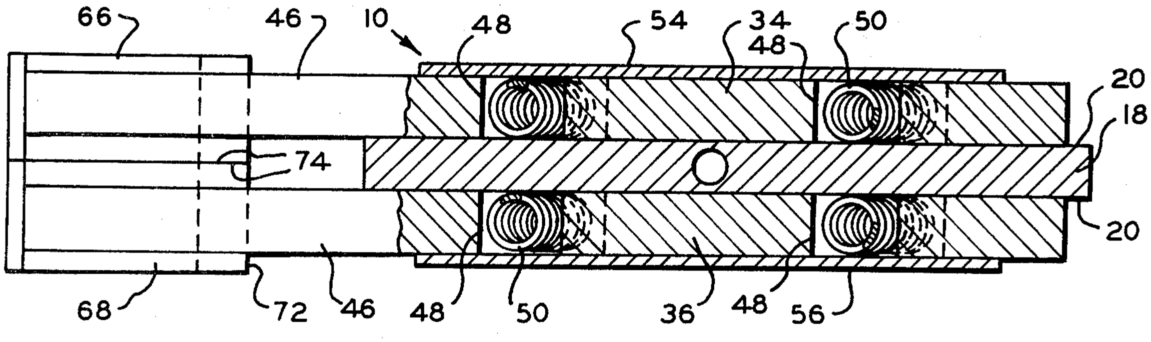
FIG. 4 is an elevational sectional view of the nozzle structure taken through Section IV—IV of FIG. 1.
Figure 3:
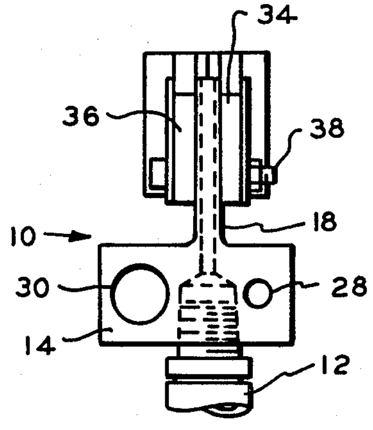
FIG. 3 is a side elevational view of the nozzle assembly.

The valve 12 is threaded into the nozzle structure 10 whose configuration is best appreciated from FIGS. 1–3. The nozzle structure includes an enlarged portion 14 having a threaded bore 16 to receive the threaded outlet of the valve 12, and also includes a relatively thin plate portion 18 having planar, parallel sides 20, end edges 22, and an outer flat edge 24. A nozzle passage 26 is defined in the nozzle plate 18 from bore 16 intersecting the edge 24, FIG. 2, to define the nozzle orifice.

The enlarged portion 14 of the nozzle includes a cavity 28 for receiving an electric heater element, not shown, and a cavity 30 is also defined in the portion 14 for receiving a temperature sensing device, not shown, controlling operation of the heater within cavity 28. The nozzle plate portion 18 is provided with an oblique surface 32 intersecting an end edge 22 and the outer edge 24 to aid in alignment of the glass panes when initially approaching the nozzle assembly.

A pair of sealant containment plates 34 and 36 are movably mounted on plate 18, a containment plate being mounted upon each side 20 of the nozzle plate 18 for sliding movement thereon in a plane parallel to the plane of the nozzle plate. The containment plates are mounted upon the nozzle plate 18 by means of a pair of guide posts 38 which are slidably received within holes defined in the nozzle plate. The containment plates 34 and 36 are of identical construction and each includes a forward edge 40, and oblique edge 42, and a pane engaging edge 44, and an extension 46 extends to the left, FIG. 1, from each plate.

Each of plates 34 and 36 is provided with a pair of elongated cavities 48 in which a compression spring 50 is mounted under compression. At one end each spring 50 bears against the flat cavity end 52, and at the other end the spring bears against a guide post 38 which extends through the cavities 48 adjacent the other end thereof, FIG. 1, and in this manner the containment plates 34 and 36 are biased outwardly and to the right as viewed in FIG. 1 relative to the nozzle plate 18 due to the oblique orientation of the cavities 48 to the associated edge 44. The containment plates 34 and 36 are maintained in a firm sliding relationship to the nozzle plate 18 by spring retainer plates 54 and 56 which overlie the plates 34 and 36, respectively, and maintain the springs 50 in their respective cavitites 48. Spring washers 58 compressed by nuts 60 threaded on posts 38 bear on the spring retainer plate 34 and the heads 62 engage plate 36 and the biasing tension produced by the washers 58 will firmly maintain the assembly of the containment plates 34 and 36 on the nozzle plate 18 and permit the containment plates to slide relative to the plate 18 in the longitudinal direction of the cavities 48. By tightening the nuts 60 the biasing force holding the containment plates upon the nozzle plate 18 may be adjusted.

The extensions 46 are each provided with an oblique surface 64, FIG. 1, upon which is mounted a scraper blade 66 on the extension of plate 34 and a scraper blade 68 on the extension of plate 36 by means of threaded bolts 70. The scraper blades are provided with a sharp leading cutting edge 72, and are also provided with sharp lateral cutting edges 74, the cutting edges 74 of each scraper blade being in engagement and equidistant from the nozzle plate sides 20 as will be appreciated from FIG. 2. It will also be appreciated that the width of the scraper blades 66 and 68 is substantially greater than the thickness of the containment plates 34 and 36. As will be noted from FIGS. 1 and 6, the scraper blade edges 72 are in alignment with the associated containment plate pane engaging edge 44.

In use, the nozzle 10 is mounted upon support structure, not shown, usually adjacent a horizontal conveyor table capable of horizontally supporting a multi-pane assembly 76 prior to application of the sealant. The multi-pane assembly prior to sealing consist of a pair of flat glass panes 78 and 80 in superimposed relationship separated by a spacer 82 having a cross sectional configuration apparent in FIGS. 5, 6, and 8–10. The spacing between the glass panes is determined by the maximum dimension of the spacer, and the tapered configuration of the spacer permits a significant amount of sealant to enter between the spacer and the glass panes adjacent the pane edges.

When initially assembling the glass panes 78 and 80 and the spacer 82 it is attempted to accurately align the edge 84 of pane 78 with edge 86 of pane 80. However, during handling of the assembly 76 on the conveyor table, and possibly because of inaccuracies occuring during glass cutting, a limited misalignment usually exists between the pane edges 84 and 86 as will be appreciated from FIG. 5 and 6.

The multi-pane assembly 76 approaches the nozzle 10 in the direction of the arrow as illustrated in FIG. 1. As the multi-pane assembly is moved in the direction of the arrow the corner of edge 84 will engage the uppermost containment plate 34 oblique surface 42, and force the engaged plate 34 to the left and rearwardly until the pane edge 84 slides upon the containment plate edge 44 and the springs 50 of plate 34 will maintain a tight engagement relationship between the containment plate edge 44 and the pane edge 84 as will be appreciated from FIG. 5.

Figure 5:
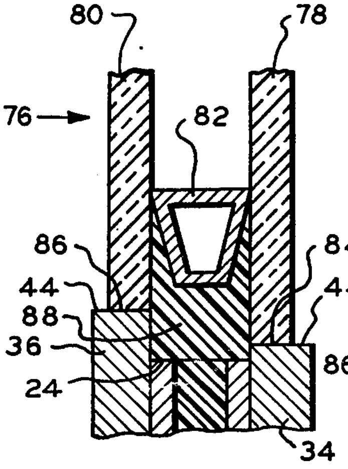
FIG. 5 is an enlarged, detail, elevational sectional view as taken along Section V—V of FIG. 7, illustrating the introduction of the sealant with the pane edges misaligned.

Likewise, the lower containment plate 36 is in alignment with the lower glass pane 80 and will engage the lower pane edge 86 and be deflected against the biasing action of the springs 50 until the pane edge 86 engages the containment plate 36 edge 44, FIG. 5. Thus, as the multi-pane assembly 76 is moved passed the nozzle assembly 10 a firm and parallel engagement exists between the containment plates edges 44 and the glass pane edges 84 and 86 as appreciated from FIG. 5.

The heated butyl sealant 88 is introduced into the confined space between the containment plates 34 and 36 directly into the space intermediate the glass panes 78 and 80, and as the sealant is introduced into this space under pressure through passage 26 the sealant will quickly flow into this cavity and completely fill the space intermediate the glass panes, but the sealant is prevented from flowing past the pane edges 84 or 86 due to the containment plates 34 and 36, respectively.

Figure 7:
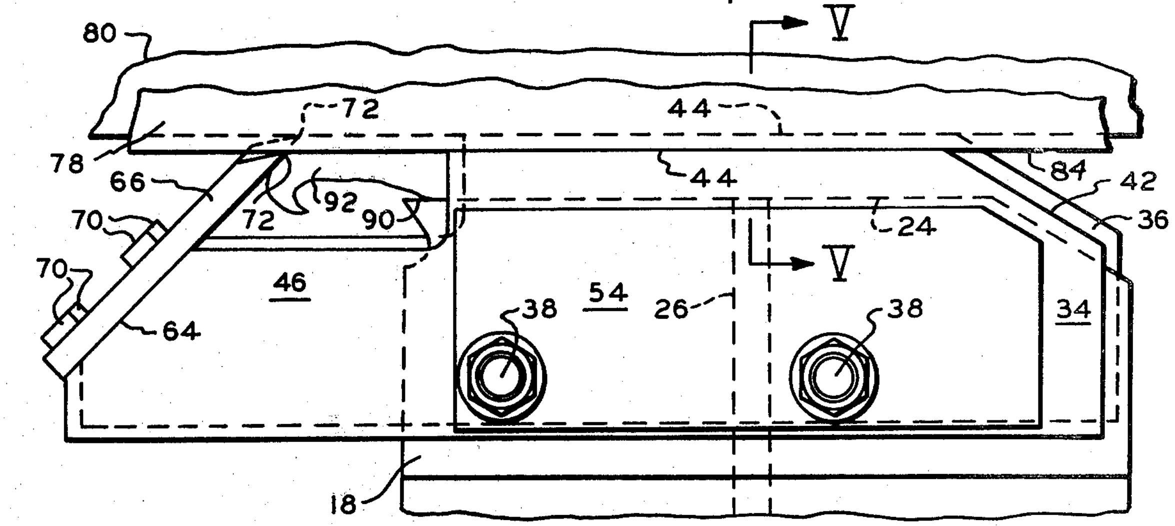
FIG. 7 is a plan, elevational view of the nozzle assembly during sealing and trimming of a multi-pane assembly.

As the pane edges move past the containment plate's edges 44 the sealant will be "wiped" by the nozzle plate edge 90, and excess sealant exists as shown at 92 in FIG. 7. However, as the scraper blades 66 and 68 only slightly "trail" the containment edges 44 the scraper blades will engage and cut the hardening sealant material as shown in FIG. 7. As the blade edges 72 are in alignment with the associated containment plate edge 44 and the associated glass pane edge 84 and 86, the scraper blades will engage the glass pane edge scraping the sealant therefrom, if any exists, and the scraper edge 74 of the scraper blade attached to the containment plate extending the maximum distance beyond the nozzle plate edge 24 will trim the sealant to the center line of the window unit.

Figure 6:
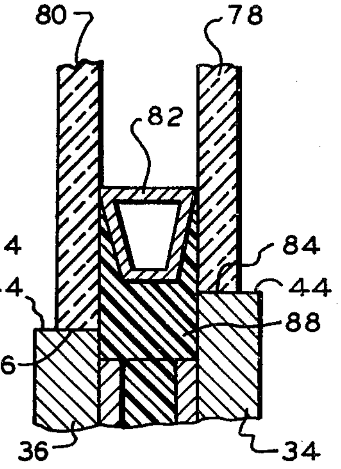
FIG. 6 is a view similar to FIG. 5, illustrating the arrangement of components at another misaligned relationship of the glass panes.

In FIG. 6 a sectional view is shown similar to FIG. 5 but illustrating a window pane arrangement whereby pane edge 86 extends "beyond" pane edge 84, rather than visa versa as in FIG. 5. Thus, in FIG. 6 the containment plate 34 will extend beyond nozzle edge 24 further than containment plate 36 and a confined space is defined into which the sealant is injected.

Figure 8:
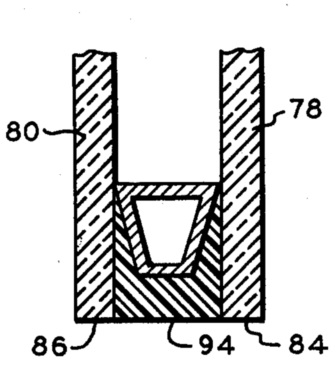
FIG. 8–10 are enlarged, detail, elevational, sectional views illustrating various multi-pane assemblies as determined by the relationship of the glass pane edges.
Figure 9:
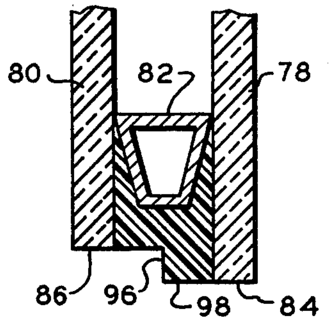
Figure 10:
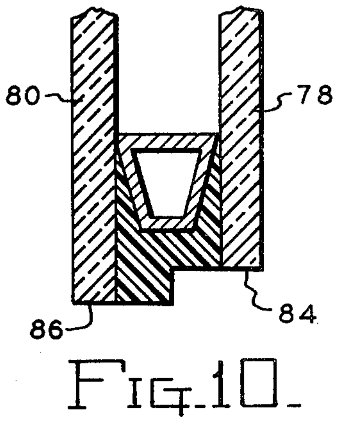

Various configurations of multi-pane assemblies after introduction of the sealant and sealant trimming will be appreciated from FIGS. 8–10. In FIG. 8, the glass panes 78 and 80 have been accurately positioned whereby their edges 84 and 86 are in alignment, and under these conditions the scraper blades have also been in alignment whereby a squared configurarion exists between the pane edges and sealant edge 94. This condition is the ideal situation, but is seldom achieved.

In FIG. 9, the glass pane 80 is disposed upwardly with respect to the glass pane 78 resulting in an offset between the pane edges 86 and 84. Accordingly, the scraper blade associated with the containment plate engaging pane edge 86 will trim the sealant to produce the right angle shown at 96, while the scraper blade associated with the containment plate engaging pane edge 84 will produce the sealant surface 98. Thus, it will be appreciated that even though the panes 78 and 80 were misaligned during assembly the resultant trimmed edge of the multi-pane assembly is "clean", effective and will not create problems during installation in the window supporting framework.

In FIG. 10, an offset relationship between the glass panes 78 and 80 is disclosed which is the opposite to that shown in FIG. 9, and the concepts are the same as with respect to FIG. 9 except that the right angle occuring in the sealant results from the scraper blade affixed to the containment plate engaging pane 78 and edge 84.

It will be appreciated that the spacer 82 must be set inwardly from the pane edges sufficiently so that even under maximum pane offset conditions the scraper blades will not engage the spacer.

The nozzle of the invention is capable of efficiently and accurately assembling panes of glass of multi-pane assembly even though the pane edges are misaligned, within limits, and yet an edge configuration of accurate dimension can be achieved which does not interfere with the multi-pane assembly installation. The thickness of the nozzle plate 18 is preferably equal to the spacing between the panes being assembled and with units of greater or lesser pane separation a nozzle plate will be employed which corresponds in dimension to the particular window unit dimensions.

It is appreciated that various modifications to the inventive concept may be apparent to those skilled in the art without departing from the spirit and scope thereof.

I claim:

1. A nozzle for sealing multi-pane window units with a flowable hardenable sealant comprising, in combination, a flat nozzle plate having planar sides and an outer edge, a sealant passage defined in said plate having an inlet and an outlet defined at said outer edge, sealant supply means communicating with said passage inlet, a sealant containment plate mounted upon each planar side of said nozzle plate each having a linear pane engagable edge disposed adjacent said passage outlet, mounting means mounting said containment plates upon said nozzle plate for slidable movement thereon whereby said linear edges are movable with respect to each other and said nozzle plate outer edge, said mounting means including springs biasing said containment plates in a direction transverse to said linear edges and outer edge, and a sealant scraper blade mounted upon each containment plate having a first edge in alignment with and behind said linear edge of the associated containment plate, said containment plates being spaced apart a distance substantially corresponding to the spacing between glass panes to be assembled whereby the edge of a pane of a window unit being assembled engages a containment plate linear edge in a parallel manner positioning the engaged containment plate relative to said nozzle plate and said scraper blades remove sealant from the window unit upon movement of the unit toward said blades in a direction parallel to said linear edges.

2. In a nozzle for sealing multi-pane window units as in claim 1, said scraper blades each including a second edge lying in the plane equidistant from said planar sides of said nozzle plate, said second scraper blade edges of said scraper blades being contiguous.

3. In a nozzle for sealing multi-pane window units as in claim 2 wherein said first scraper blade edges are linear and coplanar with said linear edge of the associated containment plate and said second scraper blade edges are perpendicular to said first blade edges.

4. In a nozzle for sealing multi-pane window units as in claim 1 wherein the thickness of said nozzle plate as defined by said planar sides thereof is substantially equal to the spacing between the panes of window unit being sealed.

5. In a nozzle for sealing multi-pane window units as in claim 1 wherein said nozzle plate includes heater means for heating said nozzle plate.

6. In a nozzle for sealing multi-pane window units as in claim 1, said containment plates including guide slot spring cavities obliquely related to said containment plates linear edges whereby movement of said containment plates on said nozzle plate is in a direction oblique to said linear edges.

* * * * *